United States Patent
Kingdon et al.

[11] Patent Number: 6,078,818
[45] Date of Patent: Jun. 20, 2000

[54] SYSTEM AND METHOD FOR IMPLEMENTING POSITIONING QUALITY OF SERVICE

[75] Inventors: Christopher H. Kingdon, Garland; Bagher R. Zadeh, Dallas; Maya Roel-Ng, Plano; Stephen Hayes, Carrollton, all of Tex.

[73] Assignee: Ericsson Inc., Research Triangle Park, N.C.

[21] Appl. No.: 09/036,918

[22] Filed: Mar. 9, 1998

[51] Int. Cl.[7] ............................................. H04Q 7/20
[52] U.S. Cl. ............................................. 455/456; 455/440
[58] Field of Search ................................. 455/456, 440, 455/63, 67.3, 457, 67.1, 524

[56] References Cited

U.S. PATENT DOCUMENTS

| | | | |
|---|---|---|---|
| 5,444,450 | 8/1995 | Olds et al. ............................ | 342/357 |
| 5,485,163 | 1/1996 | Singer et al. ......................... | 342/457 |
| 5,659,596 | 8/1997 | Dunn ................................... | 455/456 |
| 5,724,660 | 3/1998 | Kauser et al. ........................ | 455/456 |
| 5,732,354 | 3/1998 | MacDonald .......................... | 455/456 |
| 5,781,628 | 7/1998 | Alperovich et al. ................. | 380/49 |
| 5,926,761 | 7/1999 | Reed et al. .......................... | 455/440 |
| 5,926,765 | 7/1999 | Sasaki ................................. | 455/456 |
| 6,002,936 | 3/1998 | Roel-ng et al. ..................... | 455/456 |

FOREIGN PATENT DOCUMENTS 0 800 319 A1   10/1997   European Pat. Off. .

OTHER PUBLICATIONS

PCT International Search Report dated Jun. 11, 1999.

*Primary Examiner*—Edward F. Urban
*Assistant Examiner*—Tilahun Gesesse
*Attorney, Agent, or Firm*—Jenkens & Gilchrist, P.C.

[57] ABSTRACT

A telecommunications system and method is disclosed for allowing an application requesting positioning of a mobile terminal to indicate the quality of positioning information desired, e.g., timeliness, accuracy, etc. In addition, prior to performing the positioning, the cellular network can determine whether the quality of service requested can be achieved, and if so, return the positioning information along with a message indicating that the quality of service requested was achieved. However, if the quality of service requested cannot be achieved, a failure message is sent to the requesting application and the positioning is not performed.

28 Claims, 4 Drawing Sheets

SYSTEM AND METHOD FOR IMPLEMENTING POSITIONING QUALITY OF SERVICE

BACKGROUND OF THE PRESENT INVENTION

1. Field of the Invention

The present invention relates generally to telecommunications systems and methods for determining the location of a mobile terminal within a cellular network, and specifically to enabling a requesting application to indicate the quality of positioning information desired and to allow the cellular network performing the positioning to indicate whether the quality of service requested can be achieved.

Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 18 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Determining the geographical position of a MS 20 within a cellular network 10 has recently become important for a wide range of applications. For example, positioning services may be used by transport and taxi companies to determine the location of their vehicles. In addition, for emergency calls, e.g., 911 calls, the exact location of the MS 20 may be extremely important to the outcome of the emergency situation. Furthermore, positioning services can be used to determine the location of a stolen car, for the detection of home zone calls, which are charged at a lower rate, for the detection of hot spots for micro cells, or for the subscriber to determine, for example, the nearest gas station, restaurant, or hospital.

As can be seen in FIG. 2 of the drawings, upon a network positioning request, the Base Station System (BSS) (220 and 240) serving the MS 200 generates positioning data, which is delivered to the Mobile Switching Center (MSC) 260. This positioning data is then forwarded to a Mobile Positioning Center (MPC) 270 for calculation of the geographical location of the MS 200. The location of the MS 200 can then be sent to the application 280 that requested the positioning. Alternatively, the requesting application 280 could be located within the MS 200 itself or within the network (MSC/VLR 260).

In order to accurately determine the location of the MS 200, positioning data from three or more separate Base Transceiver Stations (210, 220, and 230) is required. This positioning data for GSM systems can include, for example, Timing Advance (TA) values, which correspond to the amount of time in advance that the MS 200 must send a message in order for the BTS 220 to receive it in the time slot allocated to that MS 200. When a message is sent from the MS 200 to the BTS 220, there is a propagation delay, which depends upon the distance between the MS 200 and the BTS 220. TA values are expressed in bit periods, and can range from 0 to 63, with each bit period corresponding to approximately 550 meters between the MS 200 and the BTS 220. It should be understood, however, that any estimate of time, distance, or angle for any cellular system can be used, instead of the TA value discussed herein.

Once a TA value is determined for one BTS 220, the distance between the MS 200 and that particular BTS 220 is known, but the actual location is not. If, for example, in the GSM system, the TA value equals one, the MS 200 could be anywhere in an annular region from a radius of 550 meters to a radius of 1100 meters. Two TA values from two BTSs, for example, BTSs 210 and 220, provide two possible regions where the MS 200 could be located (where the two annuluses intersect). However, with three TA values from three BTSs, e.g., BTSs 210, 220, and 230, the location of the MS 200 can be determined with a certain degree of accuracy. Using an appropriate algorithm, with knowledge of the three TA values and site location data associated with each BTS (210, 220, and 230), the position of the mobile station 200 can unambiguously (except for certain geometrical configurations) be determined (with a certain accuracy) by the Positioning Center 270.

Therefore, Timing Advance (TA) values are obtained from the original (serving) BTS 220 and two neighboring (target) BTSs (210 and 230). In order for each target BTS (210 and 230) to determine a TA value, a positioning handover to each of the BTSs (210 and 230) must occur. A positioning handover is similar to an ordinary asynchronous handover. The target BTS, e.g., BTS 210, distinguishes the Positioning Handover from an ordinary handover by a new ACTIVATION TYPE in the CHANNEL ACTIVATION message. Unlike an ordinary handover, upon reception of a HANDOVER ACCESS message from the MS 200, the target BTS 210 only calculates the TA value, and does not respond to the mobile station 200, that is, no PHYSICAL INFORMATION is sent to the MS 200. Thus, the MS 200 will then return to the previous channel allocated by the original BTS 220 after the time period defined by the MS's 200 internal counter expires, e.g., 320 milliseconds.

Once the position of the MS 200 is determined, this location is sent to the requesting application 280. However, requesting applications 280 do not currently have the ability to indicate the quality of positioning information desired, e.g., the accuracy and/or timeliness of the positioning information. Many requesting applications 280 may wish to be able to specify Quality of Service (QOS) parameters for the positioning of a particular MS 200, such as the data rate and/or reliability of the positioning information returned by the cellular network 205 performing the positioning. In addition, once QOS parameters are received by the network 205 performing the positioning, the network 205 must be able to indicate to the requesting application 280 whether the QOS indicated can be achieved. Currently, there is no known method for receiving quality of service requests or acknowledging attainment of the quality of service requested.

It is, therefore, an object of the present invention to allow requesting applications to indicate the quality of service desired with respect to the positioning information obtained.

It is still a further object of the present invention to enable a cellular network, prior to performing positioning of a mobile terminal, to indicate to the requesting application whether the quality of service requested can be achieved.

SUMMARY OF THE INVENTION

The present invention is directed to telecommunications systems and methods for allowing an application requesting positioning of a mobile terminal to indicate the quality of positioning information desired, e.g., timeliness, accuracy, etc. In addition, prior to performing the positioning, the cellular network must determine whether the quality of service requested can be achieved, and if so, return the positioning information along with a message indicating that the quality of service requested was achieved. However, if the quality of service requested cannot be achieved, a failure message must be sent to the requesting application and the positioning process is discontinued.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
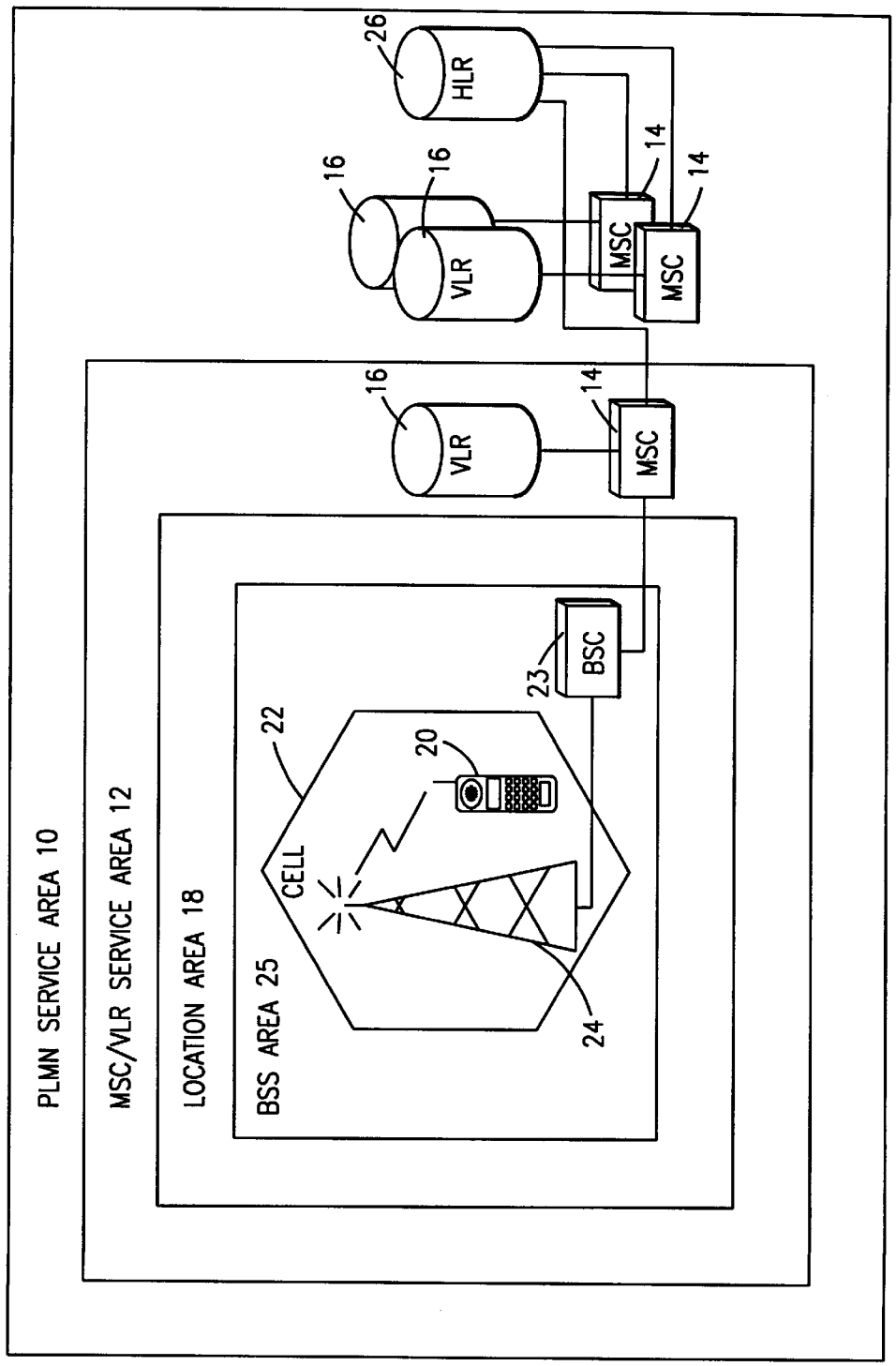
FIG. 1 is a is a block diagram of a conventional terrestrially-based wireless telecommunications system.
Figure 2:
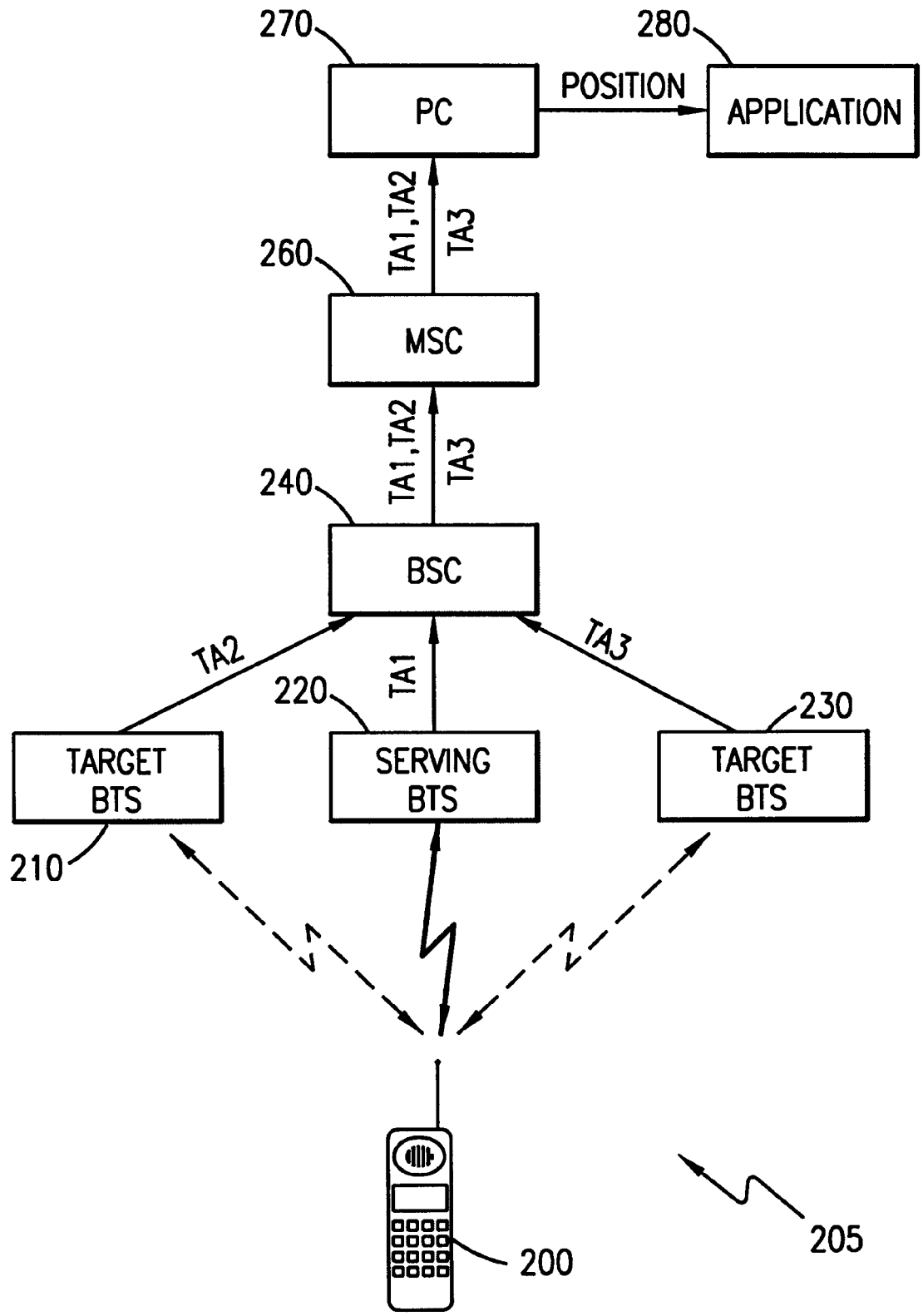
FIG. 2 illustrates a sample positioning process in which positioning data acquired by carget base transceiver stations are used to determine the location of a mobile terminal within a cellular network.
Figure 3:
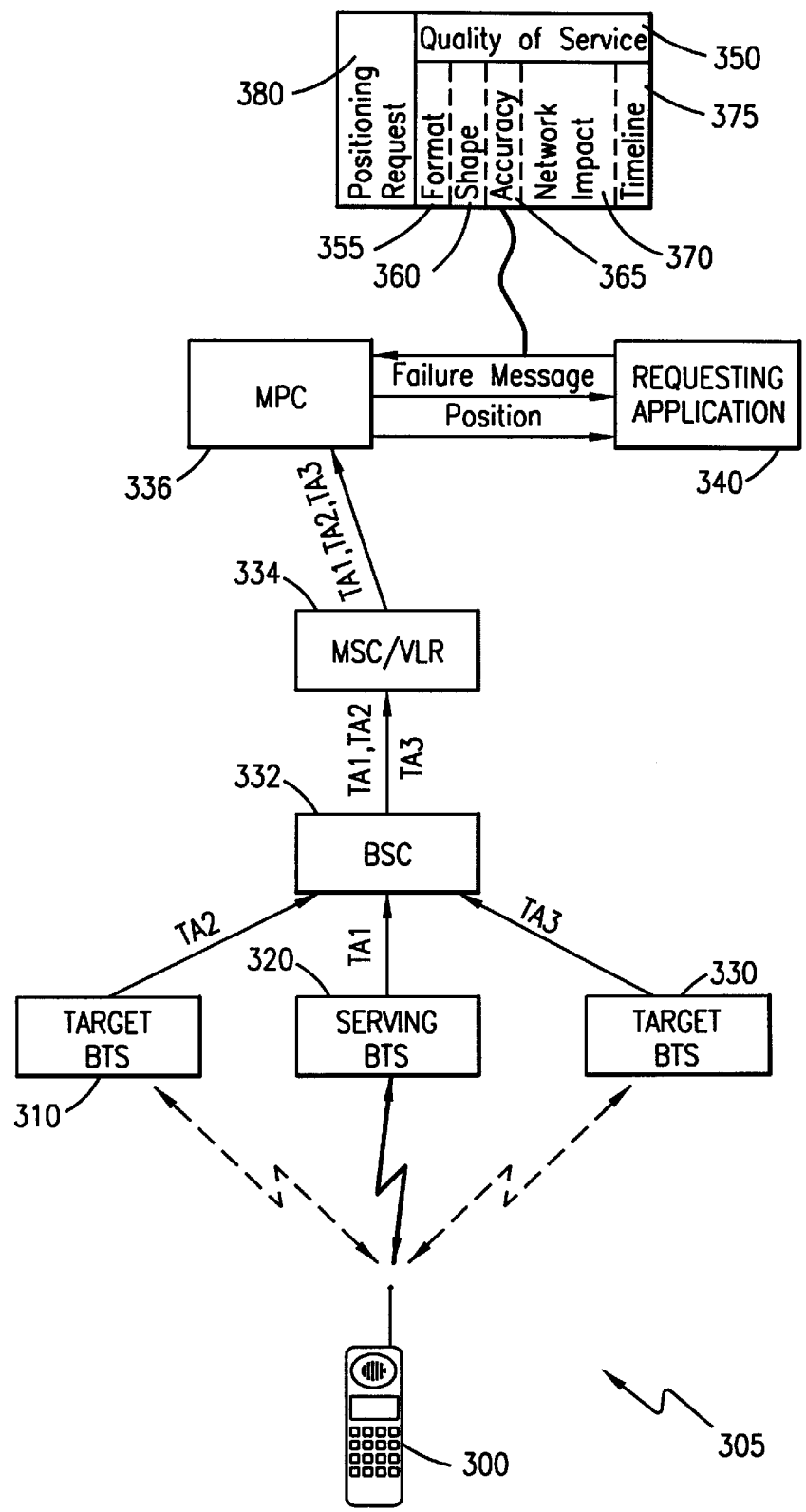
FIG. 3 illustrates the positioning of a mobile terminal within a cellular network based on quality of service information provided by an application requesting positioning.

With reference now to FIG. 3 of the drawings, when an application (node) 340 requests positioning of a Mobile Station (MS) 300 within a cellular network 305, the requesting application (node) 340 can indicate the desired Quality of Service (QOS) 350 of the returned positioning information. This QOS 350 information can be expressed depending upon the desired format 355 of positioning information returned. For example, four types of formats 355 which can be used by requesting applications include a two-dimensional static value, e.g., latitude and longitude, a three-dimensional static value, e.g., latitude, longitude, and altitude, a two-dimensional velocity vector, e.g., a two-dimensional starting point and a two-dimensional vector, and a three-dimensional velocity vector, e.g., a three-dimensional starting point and a three-dimensional vector. It should be understood that other types of formats 355 can be used instead of the four abovementioned formats 355.

For each of these formats 355, the requesting application 340 can indicate the quality of service (QOS) 350 desired for that format 355. The quality of service 350 for the requested positioning information can include the resulting shape of uncertainty 360 of the actual location of the positioned MS 300, e.g., a circle, ellipse, or polygon, the accuracy 365 of the positioning information, the timeliness 370 of the positioning information and the maximum network impact 375 for performing the positioning.

For instance, the cellular network 305 can provide certain permitted result shapes 360 for the positioning uncertainty, depending upon the format 355 desired. If a two-dimensional value (static or velocity vector) format 355 is requested by the application 340, the resulting shape of uncertainty 360 can be, for example, a circle, an ellipse or a polygon. An ellipse resulting shape 360 more accurately reflects the location of the MS 300 than a circle resulting shape 360, but the ellipse resulting shape 360 requires a more advanced requesting application 340 in order to effectively utilize the ellipse resulting shape 360. However, if a three-dimensional value (static or velocity vector) format 355 is requested by the application 340, the resulting shape 360 can be, for example, a sphere, an ellipsoid or a tiled volume. The three-dimensional formats 355 are more advanced in structure, and therefore may be undesirable for an application 340 handling numerous positioning requests with quick response times, such as an emergency application, e.g., a 911 operator.

The accuracy 365 of the positioning information can vary widely depending upon both the number of positioning data utilized and the positioning calculation method used by the cellular network 305. The accuracy 365 of the positioning information can be defined by the area enclosed by the permitted resulting shape 360 and the probability that the MS 300 is within the defined area 360. For a two-dimensional format (static or velocity vector) 355, the area enclosed by the resulting shape 360 is measured in meters$^2$, while for a three-dimensional format (static or velocity vector) 355, the volume enclosed by the resulting shape 360 is measured in meters$^3$. In addition, the accuracy 365 of a three-dimensional format 355 is dependent upon not only the accuracy of the initial position of the MS 300, but also on the accuracy of the velocity vector, e.g., the angle and speed of the MS 300.

The requesting application 340 can specify the desired maximum area (or volume) of the resulting shape 360 and the desired probability that the MS 300 is within the defined area 360. For example, the requesting application 340 can request that the uncertainty of the MS 300 location be within a 100 square meter resulting shape 360 and have a 90 percent (0.9) probability of being within that defined 100 square meter area 360. If the cellular network 305 performing the positioning cannot achieve a resulting shape 360 within the maximum allowable area (or volume) and/or cannot ensure that the probability of the MS 300 being within the defined area 360 is within the allowable probability, the cellular network 305 must inform the requesting application 340 that the desired quality of service cannot be achieved and discontinue positioning of the MS 300.

The cost to the requesting application 340 of performing the positioning is directly related to the desired size of the resulting shape area 360 and the probability of the MS 300 being within the area 360. Smaller areas and larger probabilities typically require more positioning data or more sophisticated positioning methods, which therefore requires additional allocation of network resources, e.g., measurements need to be taken from more than three Base Transceiver Stations (310, 320 and 330).

Therefore, the requesting application 340 must also consider the network impact 370, e.g., the maximum resource usage and network degradation, for the positioning request. If the requesting application 340 has budget constraints, the requesting application 340 can set a low threshold for the maximum resource usage 370. For example, on a scale of one to ten, with one being the lowest resource usage and ten being unlimited resource usage, a requesting application 340 can set the maximum resource usage 370 to one to minimize the cost of performing the positioning. However, the requesting application 340 must then also set the maximum area of the resulting shape 360 and probability factors to allow for the minimal resource usage 370 requested. In preferred embodiments of the present invention, each individual network operator 305 can define the usage threshold and associated cost for each permittable entry by the requesting application 340, e.g., a number between one and ten.

In addition, the requesting application 340 can establish the maximum amount of network degradation 370 permitted due to positioning of the MS 300. For example, if the requesting application 340 requests positioning of a MS 300 during a peak time (when a large number of mobile terminals are in use), the cost to the requesting application 340 will be greater than if the request was sent during an off-peak time. This is due to the fact that channels normally reserved for mobile terminals will need to allocated to perform the positioning. Thus, calls to and from additional Mobile Stations (not shown) within the area 305 served by the MSC/VLR 334 obtaining the positioning data cannot be placed. Therefore, the requesting application 340 must determine the amount of network degradation 370, e.g., whether to allow blocking of calls in order to perform the positioning, and send this information along with the positioning request.

An additional component of the quality of service information sent by the requesting application 340 is the timeliness 375 of the delivery of the position of the MS 300. In some cases, the requesting application 340 may need to position the MS 300 immediately, while for other applications 340, the positioning information may not need to be sent for several minutes, hours or days. For example, an emergency center, e.g., a 911 operator, will need to obtain the positioning data immediately (high priority) in order to route emergency services to the MS 300. However, if a company, e.g., a fleet or taxi company, performs positioning periodically, the company can request that the positioning be performed on a low priority basis to minimize the system load. The requesting application can specify both the required currency of the positioning data, e.g., the measurement can be up to n seconds old, and the maximum permitted position determination time, e.g., measurement result must be returned within n seconds. Once again, the cost to the requesting application 340 is proportional to the urgency of the information requested. Therefore, in order to minimize costs, the requesting application 340 can indicate that the cellular system 305 performing the positioning has unlimited time 375 to collect the positioning data and return the location.

Figure 4:
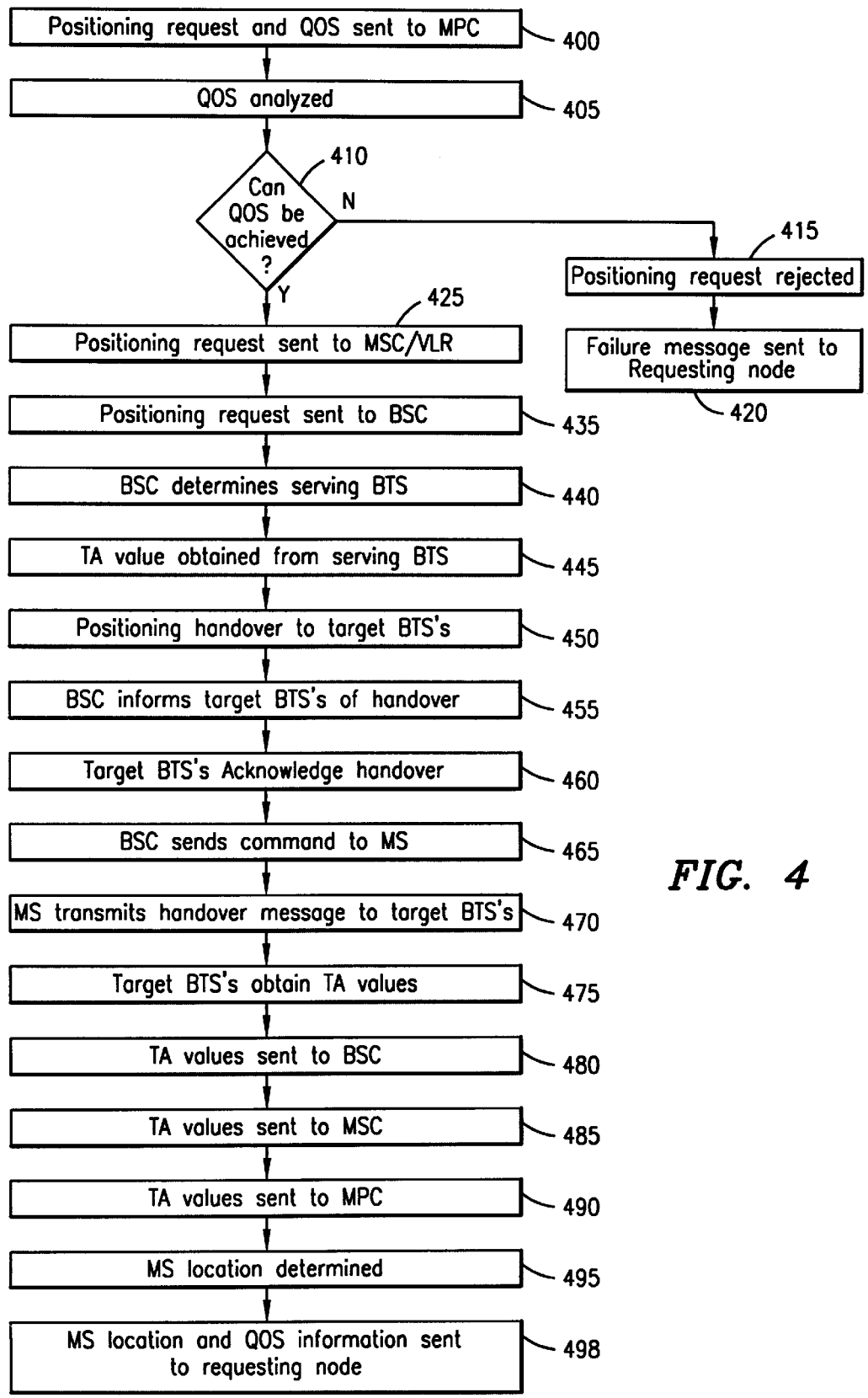
FIG. 4 shows steps in a sample positioning process which utilizes quality of service information.

With reference now to FIG. 4 of the drawings, the desired QOS information 350 is carried as part of the positioning request 380 and is sent to the Mobile Positioning Center (MPC) 336 within the cellular network 305 serving the area the MS 300 is in (step 400). Once the MPC 336 receives the positioning request 380, the MPC 336 checks the desired format 355 and QOS 350 (step 405) and determines whether the positioning can be performed (step 410). If the MPC 336 cannot provide positioning of the MS 300 with the required format 355 or requested QOS 350 (step 410), the MPC 336 will reject the positioning request 380 (step 415) and inform the requesting application 340 that positioning cannot be performed (step 420).

However, if the MPC 336 can perform the positioning (step 410), the positioning request 380 is then forwarded to the MSC/VLR 334 serving the location area that the MS 300 is in (step 425). After the positioning request 380 is received by the serving MSC/VLR 334 (step 425), the serving MSC/VLR 334 then forwards the positioning request 380 to the serving Base Station Controller (BSC) 332 (step 435). If the MS 300 is in idle mode, the serving MSC/VLR 334 must page the MS 300 and setup a call to the MS 300 prior to forwarding the positioning request 380 to the BSC 332 (step 435). This call does not activate the ringing tone on the MS 300, and therefore, is not noticed by the MS 300.

The originating BSC 332 then determines which Base Transceiver Station (BTS) 320 is currently serving the MS 300 (step 440), and obtains a Timing Advance (TA) value (TA1), or other positioning data, from this serving BTS 320 (step 445), if possible. Thereafter, TA values are obtained from two target BTSs (310 and 330) (step 475) by performing a positioning handover (step 450). If the serving BTS 320 does not support positioning, an additional target BTS (not shown) must be selected. It should be noted that other positioning methods can be used instead of obtaining TA values, as discussed herein. In addition, positioning of the MS 300 can be performed using more than three BTSs (310, 320, and 330).

The positioning handover to one of the target BTSs 330 (step 450) is accomplished by the serving BSC 332 sending a new ACTIVATION TYPE in a CHANNEL ACTIVATION message to the target BTS 330, which informs the target BTS 330 that a positioning handover needs to be performed (step 455). The target BTS 330 then acknowledges the CHANNEL ACTIVATION message to the serving BSC 332 (step 460).

Thereafter, the BSC 332 sends a command to the MS 300 via the serving BTS 320 (step 465) to transmit a HANDOVER ACCESS message to the target BTS 330 (step 470). During the time that the MS 300 is waiting for a response from the target BTS 330, e.g., around 320 milliseconds, the target BTS 330 measures the Timing Advance value (access delay) (TA3) (step 475), using access bursts sent by the MS 300, and forwards this positioning data to the serving BSC 332 (step 480). A positioning handover can then be performed to the other target BTS 310 in the same manner as stated hereinbefore. The TA value measured by the target BTS 330 (TA3) is then transmitted by the serving BSC 332 to the MSC 334, together with TA values (TA1 and TA2) obtained from the serving BTS 320 and other target BTSs 310 (step 485).

Finally, the TA value acquired from the target BTS 330 (TA3), together with other TA values (TA1 and TA2) are forwarded to the serving Mobile Positioning Center (MPC) 336 from the MSC 334 (step 490), where the location of the MS 300 is determined using the triangulation algorithm (step 495). The MPC 336 then presents the geographical position of the MS 300 and the QOS information to the requesting application (node) 340 (step 498).

The positioning response from the MPC 336 to the requesting application 340 (step 498) can contain the following information related to the QOS of the positioning measurement (based upon the format 355 of positioning information requested 380): the returned resulting shape 360, the region parameters, e.g., the points defining the resulting shape 360, the region area, which must be equal to or less than the requested area of the resulting shape 360, the probability of the MS 300 being within the region area of the resulting shape 360, which must be equal to or less than the requested probability, the time of the initial measurement, the time of the last measurement, and the positioning method used, e.g., triangulation based upon TA values. For a velocity vector format (two-dimensional or three-dimensional) 350, the MPC 336 must also indicate the estimated direction of travel and speed of the MS 300 and the error associated with both the estimated direction and speed.

As will be recognized by those skilled in the art, the innovative concepts described in the present application can be modified and varied over a wide range of applications. Accordingly, the scope of patented subject matter should not be limited to any of the specific exemplary teachings discussed.

For example, it should be noted that the location services can be used by applications located-in or connected-to the subscriber's MS, by network applications or by external applications.

What is claimed is:

1. A telecommunications system for determining the location of a given one of a plurality of mobile terminals within a cellular network, said telecommunications system comprising:

a mobile switching center in wireless communication with said given mobile terminal, said mobile switching center obtaining positioning data associated with the location of said given mobile terminal within said cellular network;

a positioning node connected to said mobile switching center, said mobile switching center forwarding said positioning data to said positioning node for positioning of said given mobile terminal; and a requesting node in communication with said positioning node, said positioning node receiving a positioning request from said requesting node, said positioning request comprising quality of service information requested by said requesting node and associated with positioning of said given mobile terminal, wherein said positioning node utilizes said quality of service information in the process of positioning said given mobile terminal.

2. The telecommunications system of claim 1, wherein said positioning node sends an acknowledgment message to said requesting node.

3. The telecommunications system of claim 2, wherein said acknowledgement message is sent to said requesting node with the location of said given mobile terminal within said cellular network.

4. The telecommunications system of claim 3, wherein said acknowledgement message indicates achievement of said quality of service information requested by said requesting node.

5. The telecommunications system of claim 2, wherein said acknowledgement message is a failure message, said failure message being sent to said requesting node prior to positioning said given mobile terminal, positioning of said given mobile terminal being terminated when said failure message is sent.

6. The telecommunications system of claim 1, wherein said quality of service information comprises accuracy information.

7. The telecommunications system of claim 6, wherein said accuracy information comprises maximum region area information and minimum probability information.

8. The telecommunications system of claim 1, wherein said quality of service information comprises timeliness information.

9. The telecommunications system of claim 8, wherein said timeliness information comprises minimum currency of said positioning data and maximum elapsed time between measurement of said positioning data and receipt of said positioning data by said positioning node.

10. The telecommunications system of claim 1, wherein said quality of service information comprises network impact information.

11. The telecommunications system of claim 10, wherein said network impact information comprises maximum permitted resource allocation information and maximum permitted network degradation information.

12. The telecommunications system of claim 1, wherein said quality of service information comprises result shape information and format information.

13. The telecommunications system of claim 12, wherein said format information is a two-dimensional format, said result shape information being selected from the group consisting of: a circle, an ellipse, and a polygon.

14. The telecommunications system of claim 12, wherein said format information is a three-dimensional format, said result shape information being selected from the group consisting of: a sphere, an ellipsoid, and a tiled volume.

15. A method for determining the location of a given one of a plurality of mobile terminals within a cellular network, said method comprising the steps of:

sending, by a requesting node, a positioning request and quality of service information requested by said requesting node and associated with positioning of said given mobile terminal to a positioning node within said cellular network, said positioning node being connected to a mobile switching center, said mobile switching center being in wireless communication with said given mobile terminal;

analyzing, by said positioning node, said quality of service information; and positioning, by said positioning node, said given mobile terminal when said positioning node determines that said quality of service information can be achieved, said step of positioning being performed by said mobile switching center obtaining positioning data associated with the location of said given mobile terminal within said cellular network and forwarding said positioning data to said positioning node.

16. The method of claim 15, further comprising, after said step of analyzing, the step of:

sending, by said positioning node, an acknowledgement message to said requesting node.

17. The method of claim 16, further comprising, after said step of positioning, the step of:

sending, by said positioning center, the location of said mobile terminal within said cellular network to said requesting node, said step of sending said acknowledgement message being performed substantially simultaneous to said step of sending the location of said given mobile terminal.

18. The method of claim 17, wherein said acknowledgement message indicates achievement of said quality of service information requested by said requesting node.

19. The method of claim 16, wherein said acknowledgement message is a failure message, said step of sending said failure message being performed prior to said step of positioning said given mobile terminal, said step of positioning said given mobile terminal not being performed when said failure message is sent.

20. The method of claim 15, wherein said quality of service information comprises accuracy information.

21. The method of claim 20, wherein said accuracy information comprises maximum region area information and minimum probability information.

22. The method of claim 15, wherein said quality of service information comprises timeliness information.

23. The method of claim 22, wherein said timeliness information comprises minimum currency of said positioning data and maximum elapsed time between measurement of said positioning data and receipt of said positioning data by said positioning node.

24. The method of claim 15, wherein said quality of service information comprises network impact information.

25. The method of claim 24, wherein said network impact information comprises maximum permitted resource allocation information and maximum permitted network degradation information.

26. The method of claim 25, wherein said quality of service information comprises result shape information and format information.

27. The method of claim 26, wherein said format information is a two-dimensional format, said result shape information being selected from the group consisting of: a circle, an ellipse, and a polygon.

28. The method of claim 26, wherein said format information is a three-dimensional format, said result shape information being selected from the group consisting of: a sphere, an ellipsoid, and a tiled volume.

* * * * *

UNITED STATES PATENT AND TRADEMARK OFFICE
CERTIFICATE OF CORRECTION

PATENT NO. : 6,078,818
DATED : June 20, 2000
INVENTOR(S) : Christopher H. Kingdon et al.

It is certified that error appears in the above-identified patent and that said Letters Patent is hereby corrected as shown below:

Column 3,
Line 61, replace "carpet" with -- target --

Signed and Sealed this

Twenty-eighth Day of August, 2001

Attest:

*Nicholas P. Godici*

NICHOLAS P. GODICI
*Attesting Officer*     *Acting Director of the United States Patent and Trademark Office*